US008879612B2

(12) United States Patent
Fujimori

(10) Patent No.: US 8,879,612 B2
(45) Date of Patent: Nov. 4, 2014

(54) TRANSMISSION CHARACTERISTIC ADJUSTMENT DEVICE, TRANSMISSION DEVICE AND METHOD FOR ADJUSTING TRANSMISSION CHARACTERISTIC

(71) Applicant: Fujitsu Limited, Kawasaki (JP)

(72) Inventor: Tomoyoshi Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/710,547

(22) Filed: Dec. 11, 2012

(65) Prior Publication Data

US 2013/0251012 A1 Sep. 26, 2013

(30) Foreign Application Priority Data

Mar. 26, 2012 (JP) .................................. 2012-070340

(51) Int. Cl.
*H04B 17/00* (2006.01)
*H04L 1/00* (2006.01)

(52) U.S. Cl.
CPC .................................... *H04L 1/0001* (2013.01)
USPC ............ 375/224; 375/257; 375/295; 375/296

(58) Field of Classification Search
CPC ................... H04L 25/03878; H04L 25/03057; H04L 25/03885; H04L 25/0272; H04L 25/028; H04L 25/497; H04L 1/0001; H04B 3/00

USPC ................................... 375/224, 257, 295, 296
See application file for complete search history.

(56) References Cited

U.S. PATENT DOCUMENTS

| 7,583,753 | B2 | 9/2009 | Okamura | |
|---|---|---|---|---|
| 2006/0188043 | A1* | 8/2006 | Zerbe et al. | 375/346 |
| 2010/0118930 | A1 | 5/2010 | Suwada | |
| 2011/0038426 | A1* | 2/2011 | Koba et al. | 375/257 |

FOREIGN PATENT DOCUMENTS

| JP | 2006-060808 | 3/2006 |
|---|---|---|
| WO | WO-2009-013790 | 1/2009 |

* cited by examiner

*Primary Examiner* — Leon Flores
(74) *Attorney, Agent, or Firm* — Fujitsu Patent Center

(57) ABSTRACT

A transmission characteristic adjustment device includes: a setting process portion that sets a setting value concerning each transmission characteristic of a plurality of electric signals to at least one of a sending device that sends the plurality of electric signals and a receiving device that receives the plurality of electric signals; a generation process portion that acquires each error rate calculated based on identification information included in each of the plurality of electric signals whenever the setting value is changed, and generates a table on which a plurality of sets of the setting value and the error rate are recorded; and an adjustment process portion that adjusts the setting value based on the table.

8 Claims, 11 Drawing Sheets

FIG. 8

| | | PRE(dB) | | | A1 |
|---|---|---|---|---|---|
| | | 0 | -3 | -5 | -7 |
| VOD (m) | 900 | 10^-11 | 10^-11 | 10^-11 | 10^-11 |
| | 865 | 10^-12 | 10^-12 | 10^-12 | 10^-12 |
| | 831 | 10^-13 | 10^-13 | 10^-13 | 10^-13 |
| | 796 | 10^-14 | 10^-15 | 10^-15 | 10^-14 |
| | 761 | 10^-14 | 10^-16 | 10^-16 | 10^-14 |
| | 727 | 10^-14 | 10^-16 | 10^-16 | 10^-14 |
| | 277 | 10^-14 | 10^-15 | 10^-15 | 10^-14 |
| | 242 | 10^-14 | 10^-15 | 10^-15 | 10^-14 |
| | 208 | 10^-13 | 10^-13 | 10^-13 | 10^-13 |
| | 35 | 10^-12 | 10^-12 | 10^-12 | 10^-12 |
| | 0 | 10^-11 | 10^-11 | 10^-11 | 10^-11 |

FIG. 9

|   |    | PRE(dB) |         |         |         |
|---|----|---------|---------|---------|---------|
|   |    | 0       | -3      | -5      | -7      |
| G (dB) | -7 | 10^-11 | 10^-11 | 10^-11 | 10^-11 |
|        | -5 | 10^-12 | 10^-15 | 10^-15 | 10^-12 |
|        | -3 | 10^-13 | 10^-15 | 10^-15 | 10^-13 |
|        | 0  | 10^-14 | 10^-14 | 10^-14 | 10^-14 |

A2

TRANSMISSION CHARACTERISTIC ADJUSTMENT DEVICE, TRANSMISSION DEVICE AND METHOD FOR ADJUSTING TRANSMISSION CHARACTERISTIC

CROSS-REFERENCE TO RELATED APPLICATION

This application is based upon and claims the benefit of priority of the prior Japanese Patent Application No. 2012-070340, filed on Mar. 26, 2012, the entire contents of which are incorporated herein by reference.

FIELD

A certain aspect of the embodiments discussed herein is related to a transmission characteristic adjustment device, a transmission device, and a method for adjusting a transmission characteristic.

BACKGROUND

With the increase in communication demand, a high-speed transmission system based on the technology of Ethernet is standardized. In IEEE802.3ba (IEEE: The Institute of Electrical and Electronics Engineers, Inc.), 40 GBASE-R and 100 GBASE-R which are transmission technology of about 40 Gbps and about 100 Gbps are specified, respectively, for example.

On the other hand, also in ITU-T (International Telecommunication Union Telecommunication Standardization Sector), the high-speed transmission technology which is adapted to the above-mentioned standard is prescribed. ITU-T recommendation G.709 prescribes technology of the Optical Transport Network (OTN) of about 40 Gbps and about 100 Gbps. This technology enables the high speed transmission of not only a frame of SDH (Synchronous Digital Hierarchy) and SONET (Synchronous Optical NET) which mainly accommodate data a sound but also an Ethernet frame which mainly accommodates data.

When a transmission device receives an optical signal in which the high-speed transmission has been performed, the transmission device performs optoelectronic conversion on the optical signal, deserializes data on an electric signal obtained by the optoelectronic conversion, with a SerDes (Serializer/Deserializer) function, thereby generating a plurality of electric signals. For example, the electrical signal of about 100 Gbps is converted into the electrical signals of about 10 Gbps×10 lanes. The electrical signal of about 40 Gbps is converted into the electrical signals of about 10 Gbps×4 lanes. The conversion process is performed in order to reduce the transmission speed of data to the degree that a logic circuit in the device can electrically process the data.

The transmission characteristics of the above-mentioned electric signals are determined according to setting values of circuits that control analog electrical characteristics in SerDes function units of a transmitting end (Tx) and a receiving end (Rx). With respect to adjustment of the setting values, a patent document 1 (see Japanese Laid-Open Patent Publication No. 2006-60808) discloses technology that transmits and receives data having a given pattern, and sets a preemphasis control value so that a transmission error of the data becomes minimum, for example. A patent document 2 (see International Publication Pamphlet No. WO 2009/013790) discloses technology that selects a plurality of combinations including an amplitude, an emphasis characteristic and so on of a signal on a transmission channel, and sets the amplitude, the emphasis characteristic and so on included in a combination extracted based on an error rate of the transmission channel.

SUMMARY

According to an aspect of the present invention, there is provided a transmission characteristic adjustment device including: a setting process portion that sets a setting value concerning each transmission characteristic of a plurality of electric signals to at least one of a sending device that sends the plurality of electric signals and a receiving device that receives the plurality of electric signals; a generation process portion that acquires each error rate calculated based on identification information included in each of the plurality of electric signals whenever the setting value is changed, and generates a table on which a plurality of sets of the setting value and the error rate are recorded; and an adjustment process portion that adjusts the setting value based on the table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a table (1);

FIG. 9 is a diagram illustrating an example of a table (2);

DESCRIPTION OF EMBODIMENTS

Figure 1:
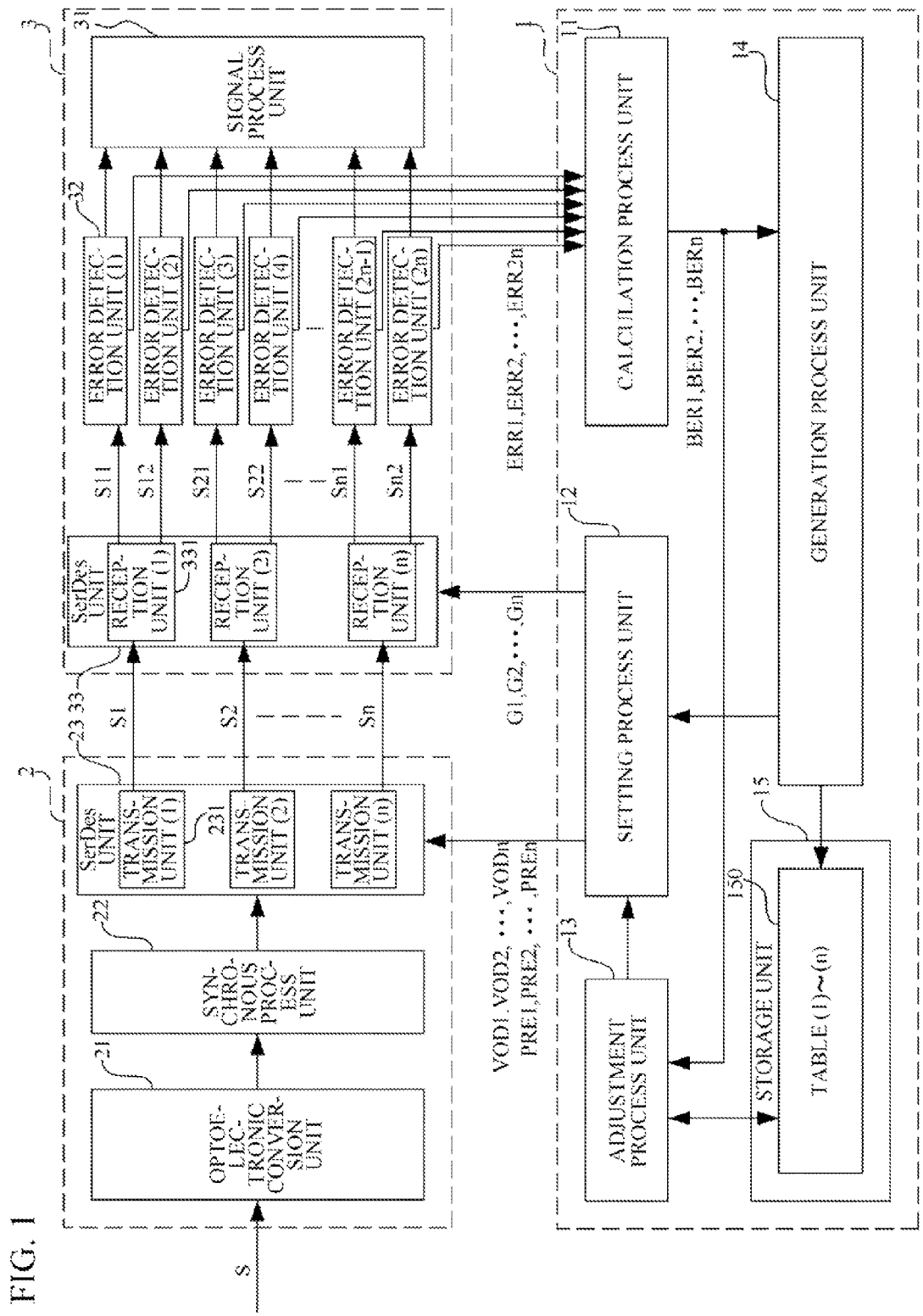
FIG. 1 is a functional block diagram of a transmission device according to an embodiment.

FIG. 1 is a functional block diagram of a transmission device according to an embodiment. The transmission device includes a transmission characteristic adjustment unit 1, an optical receiving process unit 2, and a communication process unit 3. The optical receiving process unit 2 receives an optical signal from another transmission device via an optical communication network, converts the optical signal into a plurality of electric signals S1 to Sn (n: natural number), and functions as a sending device that sends the respective signals S1 to Sn to the communication process unit 3. The communication process unit 3 functions as a receiving device that receives the plurality of electric signals S1 to Sn, and performs processes such as an error detection process with respect to the electric signals S1 to Sn. The transmission characteristic adjustment unit 1 is a transmission characteristic adjustment device that adjusts setting values concerning respective transmission characteristics of the electric signals S1 to Sn in the optical receiving process unit 2 and the communication process unit 3.

The transmission device according to the present embodiment is based on OUT 4 (OUT: Optical Transport Unit) prescribed in ITU-T recommendation G.709 or 100 GBASE-R prescribed in IEEE 802.3ba. In this case, since the transmission device receives an optical signal S of about 100 Gbps, the transmission device would process the electric signals of about 10 Gbps×10 lanes. That is, the above-mentioned code "n" of the signal "Sn" is 10. The electric signals S1 to S10 are transmitted between the optical receiving process unit 2 and the communication process unit 3 at speed of about 10 Gbps. Here, when a system called "SFIS" is adopted in the case of the OUT 4, a clock signal (not shown) synchronized with the electric signals S1 to Sn is also transmitted between the optical receiving process unit 2 and the communication process unit 3.

The optical receiving process unit 2 includes an optoelectronic conversion unit 21, a synchronous process unit 22, and a transmission SerDes (Serializer/Deserializer) unit 23. An optical module called a CFP (100 Gigabit Form-factor Pluggable) can be adopted as the optical receiving process unit 2, for example. The CFP is an optical receiving device that is attachable or detachable to a main unit of the transmission device.

The optoelectronic conversion unit 21 receives the optical signal S from another transmission device, and performs the optoelectronic conversion. The synchronous process unit 22 performs frame synchronization by detecting frames which constitute the optical signal S.

The transmission SerDes (Serializer/Deserializer) unit 23 deserializes the optical signal S in accordance with a given rule, converts into the electric signals S1 to Sn, and transmits the electric signals S1 to Sn to the communication process unit 3 via n lanes (i.e., wirings), respectively. The electric signals S1 to Sn are transmitted by transmission units (1)-(n) 231 included in the transmission SerDes unit 23, respectively.

The transmission units (1)-(n) 231 include analog electric circuits such as amplifiers, and adjust analog output characteristics based on setting values VOD1 to VODn and setting values PRE1 to PREn set from the transmission characteristic adjustment unit 1, respectively. The setting values VOD1 to VODn decide amplitudes of output waveforms with respect to the electric signals S1 to Sn, respectively. Each of the setting values PRE1 to PREn is called preemphasis, and decides overshoot of the rise and decay of a corresponding output waveform.

On the other hand, the communication process unit 3 includes a reception SerDes unit 33, a plurality of error detection units (1) to (2n) 32, and a signal process unit 31. The reception SerDes unit 33 performs a receiving process of the electric signals S1 to Sn according to setting values concerning the transmission characteristics of the electric signals S1 to Sn. The electric signals S1 to Sn are received by reception units (1) to (n) 331 included in the reception SerDes unit 33, respectively.

The reception units (1) to (n) 331 include analog electric circuits such as amplifiers, and adjust analog input characteristics based on setting values G1 to Gn set from the transmission characteristic adjustment unit 1, respectively. The setting values G1 to Gn are called equalizers, and are used for the compensation of frequency components lost by the transmission of the electric signals S1 to Sn between the transmission SerDes unit 23 and the reception SerDes unit 33.

Thus, the setting values G1 to Gn, the setting values VOD1 to VODn, and the setting values PRE1 to PREn are parameters for deciding the respective transmission characteristics of the electric signals S1 to Sn between the optical receiving process unit 2 and the communication process unit 3. Here, the setting values are not limited to the setting values G1 to Gn, VOD1 to VODn, and PRE1 to PREn, and are decided according to the hardware configurations in the transmission SerDes unit 23 and the reception SerDes unit 33.

The reception SerDes unit 33 transmits the electric signals S1 to Sn to the error detection units (1) to (2n) 32 via two virtual lanes as a pair of electric signals (S11, S12), (S21, S22), . . . (Sn1, Sn2), respectively. For example, the electric signal S1 is outputted to the error detection units (1) and (2) 32 as the pair of electric signals S11, S12 of about 50 Gbps.

The error detection units (1) to (2n) 32 detect bit errors ERR1 to ERR2$n$ concerning the electric signals S11 to Sn2, based on a plurality of pieces of identification information included in the electric signals S11 to Sn2, respectively. For example, the identification information is information which the SerDes section gives to each of the electric signals S1 to Sn in order to identify data, as described later. The error detection units (1) to (2n) 32 notify the transmission characteristic adjustment unit 1 of the detected bit errors ERR1 to ERR2$n$, respectively. Each of the bit errors ERR1 to ERR2$n$ is used for the calculation of an error rate by the transmission characteristic adjustment unit 1.

The signal process unit 31 processes main signal data formed with the electric signals S11 to Sn2. For example, the signal process unit 31 detects a given alarm from the main signal data, and transfers each frame to a port in the device connected to an external router, according to destination information of each frame included in the main signal data.

Next, a description is given of the transmission characteristic adjustment unit 1. The transmission characteristic adjustment unit 1 includes a calculation process unit 11, a setting process unit 12, an adjustment process unit 13, a generation process unit 14, and a storage unit 15. Each of the process units 11 to 14 is an arithmetic processing circuit such as a CPU (Central Processing Unit), and performs a process based on a given program. Thus, each of the process units 11 to 14 is not limited to an element which works by software, and may be an element which works by hardware, such as integrated circuit for specific purpose. The storage unit 15 is a storage means, such as a memory.

The setting process unit 12 sets the setting values G1 to Gn, VOD1 to VODn, and PRE1 to PREn which concern the transmission characteristics of the electric signals S1 to Sn, to the optical receiving process unit 2 transmitting the electric signals S1 to Sn and the communication process unit 3 receiving the electric signals S1 to Sn. Each of the setting values is specified from the generation process unit 14 or the adjustment process unit 13. The setting process unit 12 may perform the setting on one of the optical receiving process unit 2 and the communication process unit 3.

The calculation process unit 11 calculates error rates BER1 to BERn of the electric signals S1 to Sn based on the bit errors ERR1 to ERR2$n$ notified from the error detection units (1) to (2n) 32, respectively. Each of the error rates BER1 to BERn is calculated by a ratio of the number of error bits to the total number of bits of each of the electric signals S1 to Sn received by the communication process unit 3 (the number of bits which has passed the communication process unit 3). The calculation process unit 11 may monitor the total number of bits of each of the electric signals S1 to Sn. The error detection units (1) to (2n) 32 may monitor the total number of bits of each of the electric signals S1 to Sun, and notify the calculation process unit 11 of the monitoring result.

As described above, in the communication process unit 3, a single electric signal Si (i=1 to n) is divided into a pair of electric signals Si1 and Si2. Therefore, the calculation process unit 11 calculates the error rate BERi for each electric signals Si by adding to each other the bit errors ERRj and ERR j+1 (J=1, 3, . . . 2n−1) detected by the error detection units 32 corresponding to the pair of electric signals Si1 and Si2. For example, the error rate BER1 is calculated based on the number of error bits acquired by adding to each other the bit errors ERR1 and ERR2 of a pair of electric signals S11 and S12.

Whenever the above-mentioned setting values G1 to Gn, VOD1 to VODn and PRE 1 to PREn are changed, the generation process unit 14 acquires the respective error rates BER1 to BERn calculated by the calculation process unit 11. Thereby, the generation process unit 14 generates tables (1) to (n) 150 on which a plurality of sets of the setting values G1 to Gn, VOD1 to VODn and PRE 1 to PREn, and the error rates BER1 to BERn are recorded. The tables (1) to (n) 150 are generated in response to the respective electric signals S1 to Sn, and stored into the storage unit 15. For example, the setting values G1, VOD1 and PRE1, and the error rate BER1 are associated with each other, and recorded on the table (1) 150.

The adjustment process unit 13 adjusts the setting values G1 to Gn, VOD1 to VODn and PRE 1 to PREn based on the tables (1) to (n) 150. Specifically, the adjustment process unit 13 monitors the error rates BER1 to BERn calculated by the calculation process unit 11. When each of the error rates BER1 to BERn exceeds a threshold value, the adjustment process unit 13 adjusts the corresponding setting values. The adjustment of the setting values is performed on the basis of the error rates recorded on the table (1) to (n) 150. The calculated error rates BER1 to BERn are monitored, and the adjustment of the setting values is repeatedly performed until each of the error rates BER1 to BERn is equal to or less than the threshold value.

The adjustment process is performed for each of the electric signals S1 to Sn. For example, the adjustment process unit 13 monitors the error rate BER1 with respect to the electric signal S1. When the error rate BER1 exceeds the threshold value, the adjustment process unit 13 adjusts the setting values G1, VOD1 and PRE1 based on the table (1) 150.

Figure 2:
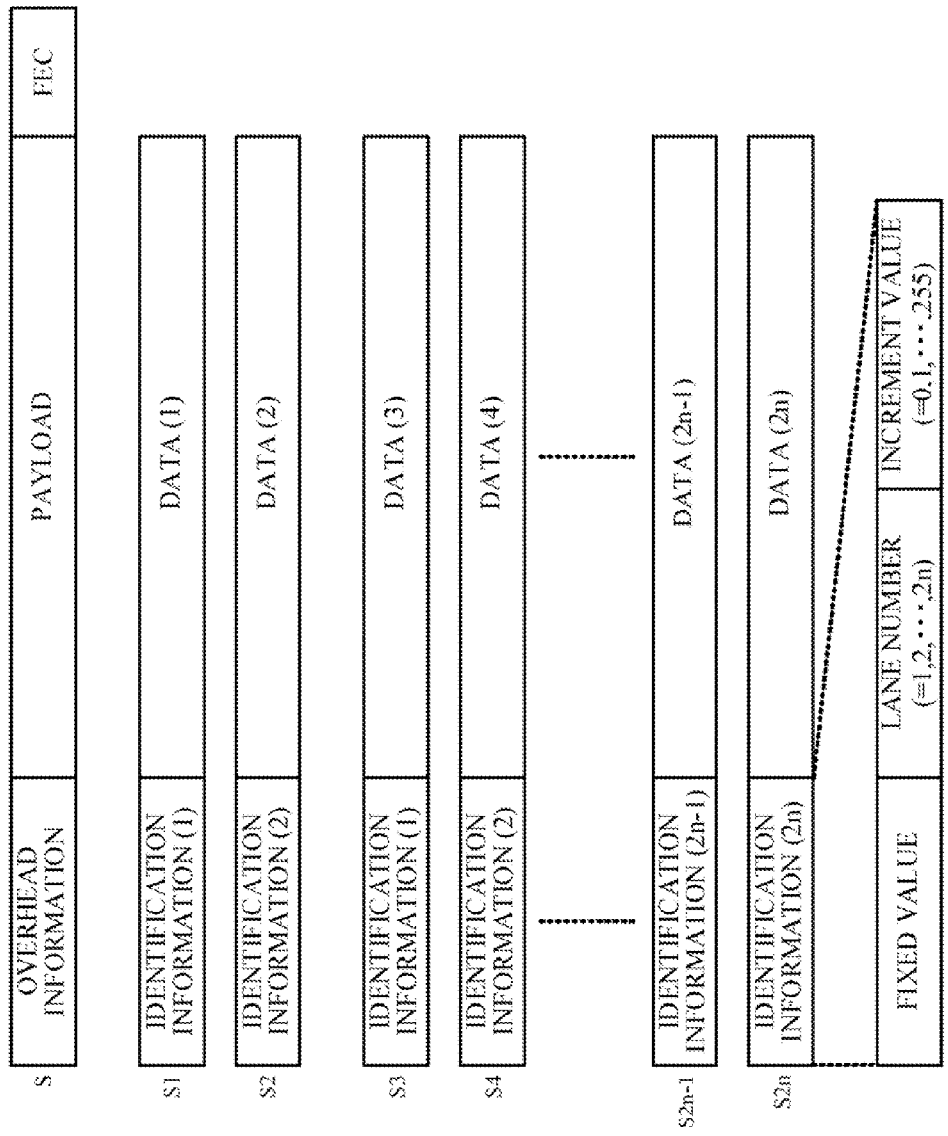
FIG. 2 is a block diagram illustrating an example of data included in respective signals.

Next, a description is given of the operation of the transmission device according to the present embodiment with reference to a concrete example. FIG. 2 is a block diagram illustrating an example of data included in respective signals. FIG. 2 illustrates an example of data based on a technique of the above-mentioned OTU4.

A frame of data on the optical signal S includes overhead information, a payload, and a FEC (Forward Error Correction). The overhead information includes detection information for detecting the frame. The synchronous process unit 22 performs the frame synchronization based on the detection information. The payload is a main part of user data, and the FEC is data for performing an error correction process.

On the other hand, each of the SerDes unit 23 and 33 deserializes the frame of data on the optical signal S according to a certain rule, so that the plurality of pieces of data on the electric signals S1 to S2$n$ are acquired. The plurality of pieces of data on the electric signals S1 to S2$n$ include identification information (1) to (2n) given by the SerDes unit 23, and data (1) to (2n) acquired by the above-mentioned deserialization, respectively.

The identification information (1) to (2n) are a plurality of pieces of information for identifying the plurality of pieces of data formed with the plurality of pieces of electric signals. Each of the identification information (1) to (2n) includes a fixed value, a lane number, and an increment value. A frame alignment overhead (FAS OH; Frame Alignment Signal Over Head) used for e.g. SONET and so on, may be adopted as the identification information (1) to (2n). In this case, the fixed value is 6 Byte of "0xF6", "0xF6", "0xF6", "0x28", "0x28", and "0x28" ("0x" indicates the hexadecimal form).

The lane number is information called LLM, and indicates the lane number "i" (i=1 to 2n) of the electric signal Si. For example, in the case of the electric signal S1, the lane number is "1". The increment value is information called MFAS, and the numerical values of the range between "0x00" and "0xFF" are repeatedly assigned to the increment value in this order. The error detection units (1) to (2n) 32 detect the bit errors ERR1 to ERR2$n$ based on the identification information (1) to (2n), respectively.

Figure 3:
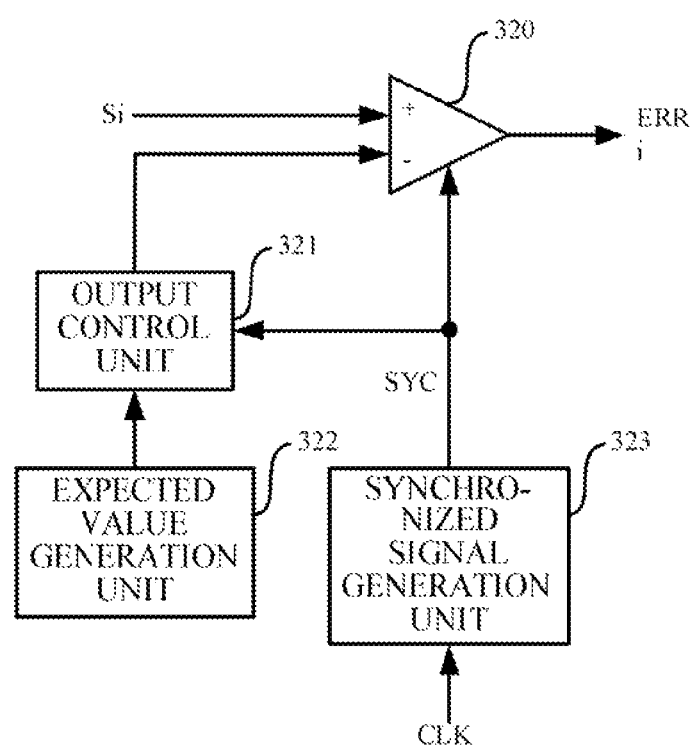
FIG. 3 is a functional block diagram illustrating an example of an error detection unit.

FIG. 3 is a functional block diagram illustrating an example of the error detection units (1) to (2n) 32. Each of the error detection units (1) to (2n) 32 includes a comparator 320, an output control unit 321, an expected value generation unit 322, and a synchronized signal generation unit 323. The error detection unit (i) 32 detects a bit error ERRi based on a comparison result between the above-mentioned identification information and an expected value by the comparator 320. The expected value is generated by the expected value generation unit 322, read out from the output control unit 321, and inputted to a noninverting input terminal (−) of the comparator 320. The expected value includes at least part of the fixed value, the lane number, and the increment value which are included in the identification information (i).

The synchronized signal generation unit 323 inputs a clock signal CLK synchronized with the electric signal Si from the outside, and generates the synchronized signal SYC based on the clock signal CLK. The synchronized signal SYC gives timing of a comparison process to the comparator 320 and the output control unit 321. By such configuration, the error detection unit (i) 32 can detect the bit error ERRi easily. Since the bit error is detected based on the identification information (i) included in the electrical signal Si, an advantage that exclusive hardware is unnecessary is acquired, as compared with the case where a test signal such as PRBS is used.

In addition, since the identification information (1) to (2n) are given to the electric signals S1 to S2$n$, respectively, each of the bit errors ERR1 to ERR2$n$ can be detected individually. On the contrary, since the bit error information included in the overhead information of the OTU4 is not each of the electrical signal S1 to S2$n$, and it relates to the signal S before the deserialization, the bit error information cannot be used for individual error detection.

Figure 4:
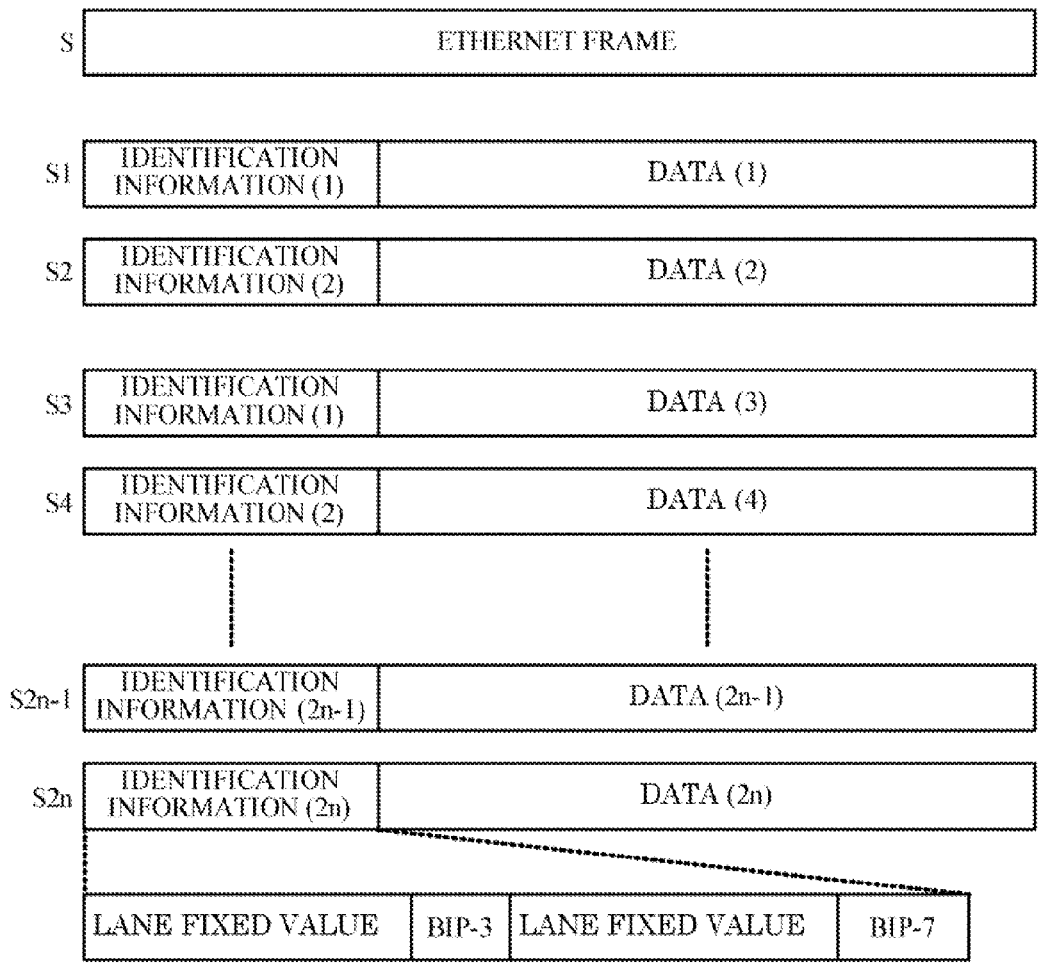
FIG. 4 is a block diagram illustrating another example of data included in the respective signals.

FIG. 4 is a block diagram illustrating another example of data included in the respective signals. FIG. 4 illustrates an example of data based on a technique of the above-mentioned 100 GBASE-R.

Each of the SerDes unit 23 and 33 deserializes the Ethernet frame of the optical signal S according to a certain rule, so that the plurality of pieces of data on the electric signals S1 to S2$n$ are acquired. The plurality of pieces of data on the electric signals S1 to S2$n$ include identification information (1) to (2n) given by the SerDes unit 23, and data (1) to (2n) acquired by the above-mentioned deserialization, respectively.

Each of the identification information (1) to (2n) includes two lane fixed values, a BIP-7 (BIP: Bit Interleaved Parity)

and a BIP-3. Alignment markers prescribed in IEEE802.3ba, for example, can be adopted as the identification information (1) to (2n).

A lane fixed value is a different predetermined numerical value for each of the lane 1 to 2n. Each of the BIP-3 and the BIP-7 is a numerical value acquired by performing the parity operation on the data for each bit string. The BIP-3 and the BIP-7 are called a level 3 and a level 7, respectively. The operation methods of the BIP-3 and the BIP-7 are different from each other.

Figure 5:
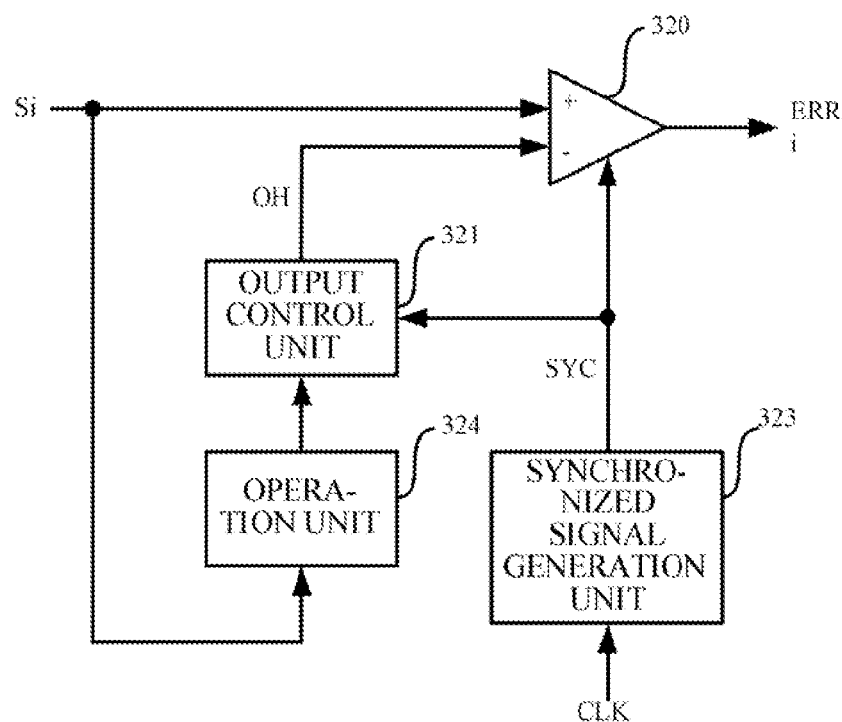
FIG. 5 is a functional block diagram illustrating another example of the error detection unit.

Also in this example, the error detection units (1) to (2n) 32 detect the bit errors ERR1 to ERR2n based on the identification information (1) to (2n), respectively. FIG. 5 is a functional block diagram illustrating another example of the error detection unit 32. In FIG. 5, elements corresponding to those in FIG. 3 described above are designated by identical reference numerals, and description thereof is omitted.

An operation unit 324 calculates the expected values of the BIP-3 and the BIP-7 by performing the parity operation on the electric signal Si. Then, the respective expected values are read out from the output control unit 321 according to the synchronized signal SYC, are inputted to the noninverting input terminal (−) of the comparator 320, and are compared with the BIP-3 and the BIP-7 of the identification information included in the electric signal Si. Therefore, the error detection unit 32 of this example detects the bit error ERRi, and the same effect is acquired, as is the case with the above-mentioned example. In this example, although each of the BIP-3 and the BIP-7 is mentioned as a comparison object, the lane fixed value may be used as the comparison object in addition to or on behalf of the BIP-3 and the BIP-7.

In the embodiment illustrated in FIG. 1, the reception SerDes unit 33 sets the electric signals 51 to Sn received from the transmission SerDes unit 23 as the pairs of electrical signals (S11, S12), . . . , (Sn1, Sn2), but the handling of the electric signals S1 to Sn is not limited to this. In the transmission device illustrated in FIG. 6, the reception SerDes unit 33 does not set the electric signals S1 to Sn received from the transmission SerDes unit 23 as the pairs of electrical signals, and the reception SerDes unit 33 outputs the electric signals S1 to Sn to error detection units (1) to (n) 35 in one-to-one relationship. Therefore, unlike the above-mentioned embodiment, a calculation process unit 16 calculates the respective error rates BER1 to BERn without performing an additional process of the bit errors with respect to the pair of the electric signals.

Figure 6:
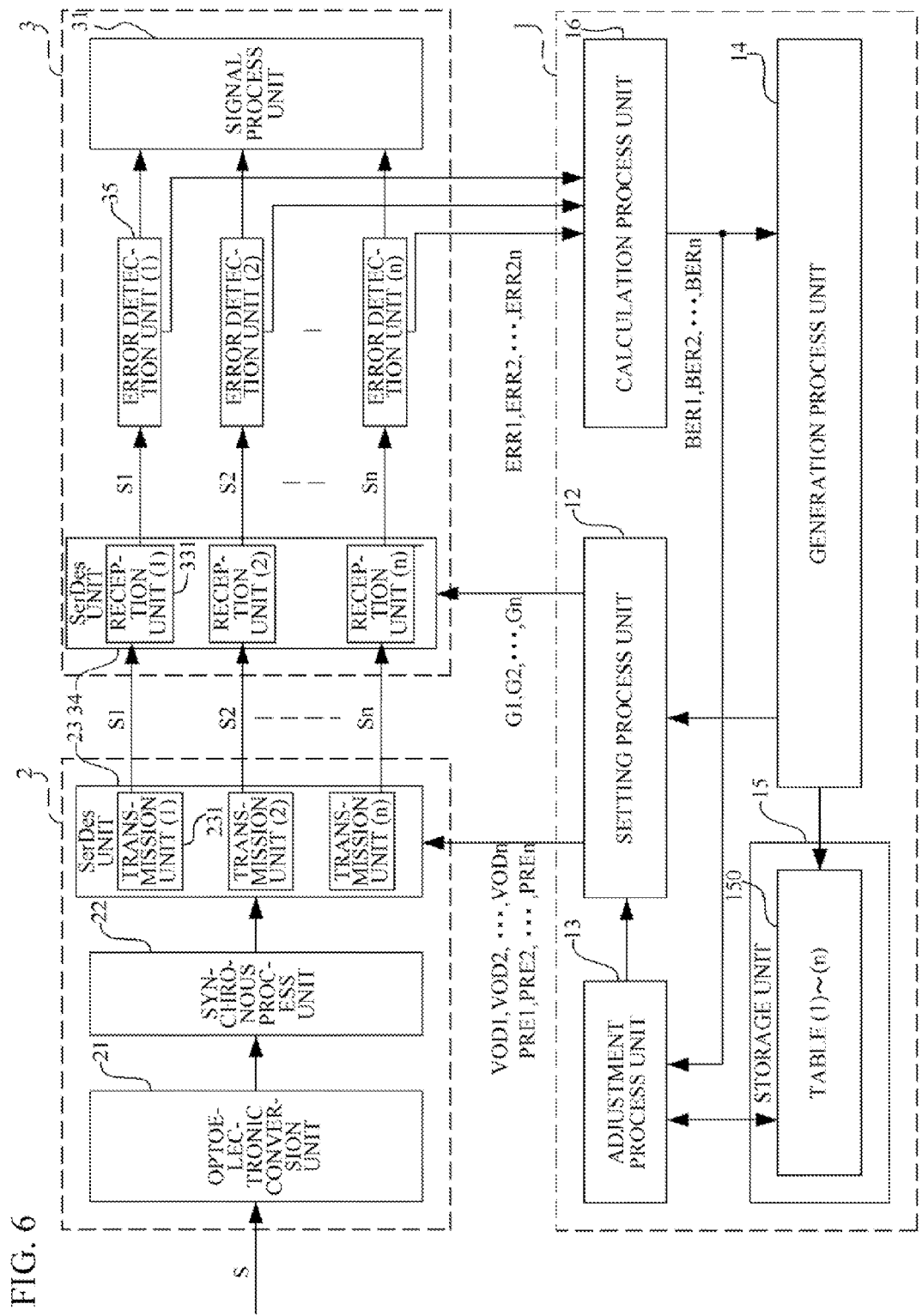
FIG. 6 is a functional block diagram of the transmission device according to another embodiment.

The embodiment in FIG. 6 is based on OUT3 prescribed in ITU-T recommendation G.709 or 40GBASE-R prescribed in IEEE 802.3ba. In this case, since the transmission device receives the optical signal S of about 40 Gbps, the transmission device processes the electric signals of about 40 Gbps×4 lanes. That is, the above-mentioned code "n" is 4, and each of the electric signals S1 to S4 is transmitted by about 10 (Gbps) between the optical receiving process unit 2 and the communication process unit 3. Also in this case, the above-mentioned identification information includes the same information as the previous embodiment.

Figure 7:
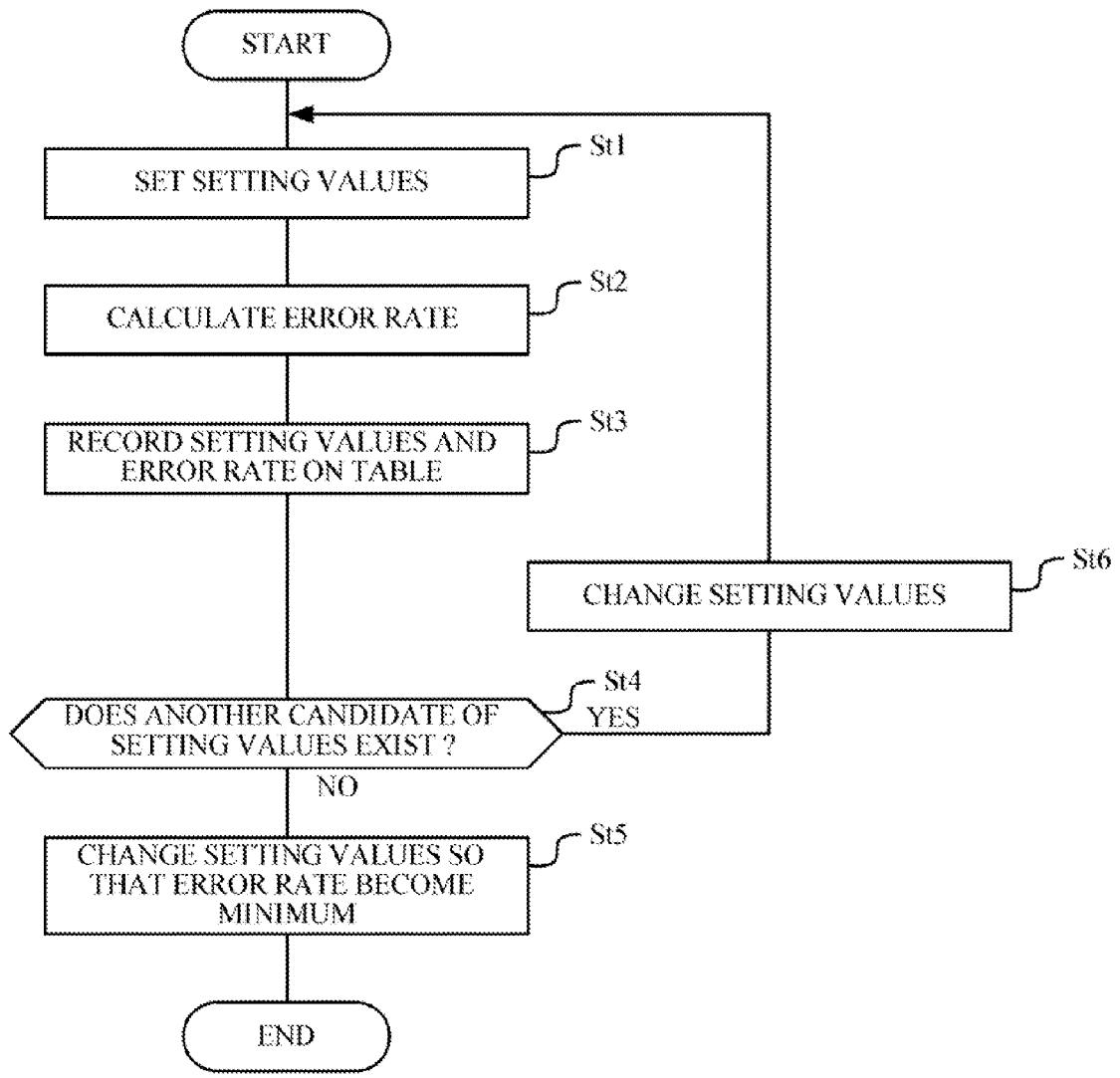
FIG. 7 is a flowchart illustrating a table generation process executed by a transmission characteristic adjustment unit.

Next, a description is given of the operation of the transmission characteristic adjustment unit 1. FIG. 7 is a flowchart illustrating a table generation process. Here, the table generation process is performed with respect to each of the electric signals S1 to Sn.

The generation process unit 14 selects one set from a plurality of sets of setting values Gi, VODi and PREi, and sets the combinatorial setting values to the SerDes units 23 and 33 or 34 via the setting process unit 12 (step St1). The plurality of sets of setting values Gi, VODi and PREi may be stored into the storage unit 15 beforehand so that the generation process unit 14 can read out and use each of the sets of the setting values.

Next, the calculation process unit 11 or 16 calculates the error rate BERi of the electric signal Si based on the bit error ERRi (or ERRj, ERRj+1) detected by the error detection unit 32 or 35 (step St2). Here, by forming the calculation process unit 11 or 16 in the communications process unit 3, the calculation process of the error rate BERi is performed by the communication process unit 3.

Next, the generation process unit 14 acquires the error rate BERi calculated by the calculation process unit 11 or 16, associates the error rate BERi with the setting values Gi, VODi and PREi set in step St1, and records the associated error rate BERi and the associated setting values Gi, VODi and PREi on the table (i) 150 (step St3). Then, when another candidate exists about the combination of the setting values (YES in step St4), the generation process unit 14 changes the combination of the setting values to the another candidate (step St6). The process is performed again from step St1. On the contrary, when another candidate does not exist about the combination of the setting values (NO in step St4), the generation process unit 14 changes the combination of the setting values Gi, VODi and PREi so that the error rate BERi becomes minimum, based on the table (i) 150 (step St5). The process is terminated.

Thus, whenever the setting values Gi, VODi and PREi which concern the transmission characteristics of the electric signals S1 to Sn are set to the optical receiving process unit 2 and the communication process unit 3, the transmission characteristic adjustment unit 1 calculates each error rate BERi of the electric signals S1 to Sn. Thereby, the transmission characteristic adjustment unit 1 generates the table (i) 150 on which the plurality of sets of the setting values Gi, VODi and PREi, and the error rate BERi are recorded.

In FIGS. 8 and 9, an example of the table (i) 150 is illustrated. The tables (i) 150 in FIGS. 8 and 9 illustrate, when a single setting value in the setting values Gi, VODi and PREi is a fixed value, the error rates corresponding to two kinds of other setting values. When the error rate is expressed as "10^-15", the expression indicates that the error rate is $1.0 \times 10^{-15}$. Thus, the table (i) 150 is not limited to a pattern corresponding to two kinds of the setting values, but may be a pattern corresponding to the combination of three kinds of the setting values.

The above-mentioned table generation process repeats the change of the setting values Gi, VODi and PREi widely, and hence the table generation process accompanies the errors of the electric signals S1 to Sn. Therefore, it is desirable that the table generation process is performed when the interruption of the communication service which has used the transmission device is permitted. As such a case, the start-up time of the transmission device and the exchange time of the optical receiving process unit 2 (i.e., the exchange time of the CFP) and so on are mentioned, for example. As long as the occurrence of the errors is permitted, the table generation process may be performed during the service.

Figure 11:
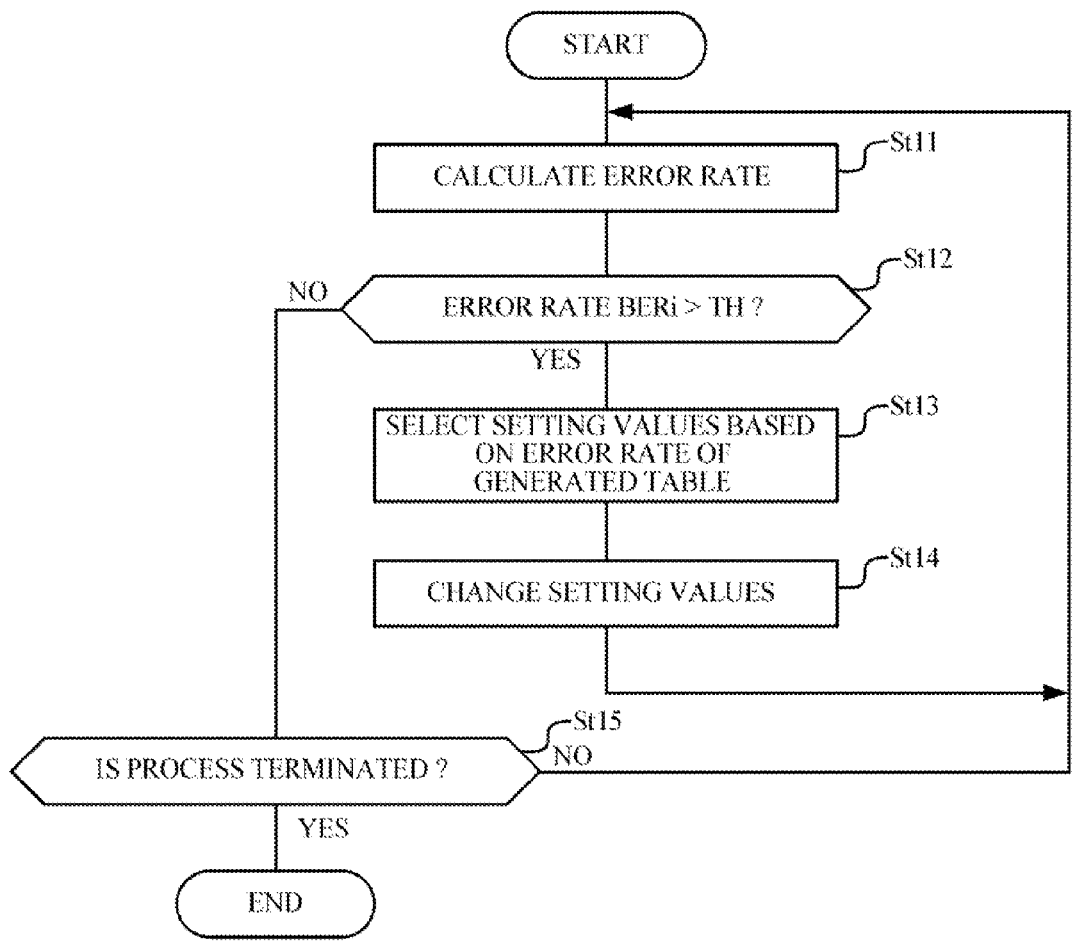
FIG. 11 is a flowchart illustrating an adjustment process of a setting value executed by the transmission characteristic adjustment unit.

Next, a description is given of an adjustment process of the setting values of the transmission characteristic adjustment unit 1, with respect to FIG. 11. The adjustment process is performed with respect to each of the electric signals S1 to Sn, as is the case with the table generation process.

The calculation process unit 11 or 16 calculates the error rate BERi of the electric signal Si based on the bit error ERRi (or ERRj, ERRj+1) detected by the error detection unit 32 or 35 (step St11). Then, the adjustment process unit 13 acquires the calculated error rate BERi, and compares the error rate BERi with a threshold value TH (step St12). The threshold value TH is $1.0 \times 10^{-15}$, for example.

Figure 10:
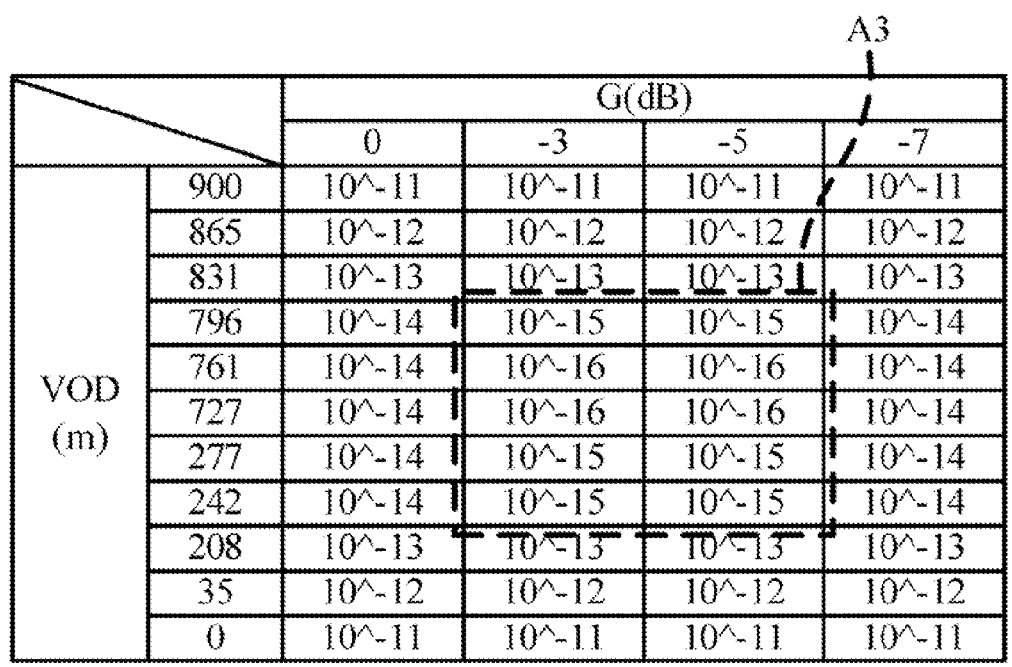
FIG. 10 is a diagram illustrating an example of a table (3)

When the error rate BERi is more than the threshold value TH (YES in step St12), the calculation process unit 11 or 16 selects the setting values Gi, VODi and PREi based on the error rate recorded on the generated table (i) 150 (step St13). The selection process is performed by considering the setting values Gi, VODi, and PREi corresponding to an error rate smaller than the threshold value TH as the candidates. For example, in the tables (1) to (n) 150 of FIGS. 8 to 10, since each error rate in the ranges indicated by codes A1 to A3 is equal to or less than the threshold value TH ($1.0 \times 10^{-15}$), the setting values Gi, VODi, and PREi corresponding to the ranges indicated by codes A1 to A3 serve as the candidates of the selection process.

The calculation process unit 11 or 16 changes the setting values Gi, VODi and PREi to be set by the setting process unit 12, to the selected setting values (step St14). Then, the process is preformed again from step St11.

On the other hand, when the error rate BERi is less than the threshold value TH (NO in step St12), if the power-off of the transmission device or the like is performed (YES in step St15), the process is terminated. If not so (NO in step St15), the process is preformed again from step St11. Thus, the adjustment process of the setting values is performed.

In the above-mentioned adjustment process, the change range of the setting values Gi, VODi and PREi is determined based on the error rate recorded on the table (i) 150, unlike the table generation process. Therefore, errors which occur by the change of the setting values Gi, VODi, and PREi are less than errors which occur by the generation process of the tables (1) to (n) 150. Even if the adjustment process is performed during the communication service which has used the transmission device, influence on the service is minimized. Therefore, the transmission characteristic adjustment unit 1 monitors the error rate, and can dynamically change the setting values in response to environmental variation such as temperature change so as to improve the transmission characteristics.

The error rate BERi is directly monitored, and the above-mentioned adjustment process is performed based on the error rate BERi, an advantage that the high responsiveness of the setting values to the change of the transmission characteristics is realizable is acquired. The adjustment process is not limited to being performed according to the error rate, but may be performed according to a temperature indicated by a temperature sensor provided in the transmission device. In this case, an effect that the setting values can be adjusted is acquired in advance of the increase in the error rate accompanying the temperature change.

As described above, each of the transmission characteristic adjustment device and the transmission device detects the error rates BER1 to BERn from identification signals included in the electric signals S1 to Sn without using special test signals such as PRBS, and generates the table (i) 150. Therefore, each of the transmission characteristic adjustment device and the transmission device can manage a corresponding one of the error rates BER1 to BERn with respect to each of the electric signals S1 to Sn(s), without using exclusive hardware and without interrupting the service by the device.

The generation process unit 14 generates the table (i) 150 on which the plurality of sets of the setting values and the error rate are recorded. The adjustment process unit 13 adjusts the setting values Gi, VODi and PREi based on the generated table (i) 150. Therefore, it is possible to curb the influence on the communication service and adjust the setting values so that the transmission characteristics improve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A transmission characteristic adjustment device comprising:
    a setting process portion that sets a setting value concerning each transmission characteristic of a plurality of electric signals to at least one of a sending device that sends the plurality of electric signals and a receiving device that receives the plurality of electric signals;
    a generation process portion that acquires each error rate calculated based on identification information included in each of the plurality of electric signals whenever the setting value is changed, and generates a table on which a plurality of sets of the setting value and the error rate which corresponds to the plurality of sets of the setting value are recorded; and
    an adjustment process portion that monitors each error rate calculated based on the identification information included in each of the plurality of electric signals, and when the monitored error rate exceeds a threshold value, selects the set of setting value corresponding to the error rate smaller than the threshold value from the table, and adjusts the setting value based on the selected set of setting value.

2. A transmission device comprising:
    a transmission characteristic adjustment device including:
    a setting process portion that sets a setting value concerning each transmission characteristic of a plurality of electric signals to at least one of a sending device that sends the plurality of electric signals and a receiving device that receives the plurality of electric signals;
    a generation process portion that acquires each error rate calculated based on identification information included in each of the plurality of electric signals whenever the setting value is changed, and generates a table on which a plurality of sets of the setting value and the error rate which corresponds to the plurality of sets of the setting value are recorded; and
    an adjustment process portion that monitors each error rate calculated based on the identification information included in each of the plurality of electric signals, and when the monitored error rate exceeds a threshold value, selects the set of setting value corresponding to the error rate smaller than the threshold value from the table, and adjusts the setting value based on the selected set of setting value; and
    the receiving device that receives the plurality of electric signals,
    wherein the receiving device performs a receiving process of the electric signals according to the setting value concerning each transmission characteristic of the electric signals, and
    the setting process portion sets the setting value to the receiving device.

3. The transmission device as claimed in claim 2, wherein the receiving device includes a plurality of error detection portions each that detects a bit error with respect to each of the electric signals, based on the identification information included in each of the electric signals, and the error rate is calculated based on the bit error.

4. The transmission device as claimed in claim 3, wherein each of the error detection portions detects the bit error based on a comparison result of the identification information and an expected value.

5. The transmission device as claimed in claim 2, wherein the identification information is information for identifying data formed with each of the electric signals.

6. A method for adjusting a transmission characteristic comprising:

calculating each error rate of a plurality of electric signals based on identification information included in each of the electric signals whenever a setting value concerning each transmission characteristic of the electric signals is set to at least one of a sending device that sends the electric signals and a receiving device that receives the plurality of electric signals;

generating a table on which a plurality of sets of the setting value and the error rate which corresponds to the plurality of sets of the setting value are recorded;

monitoring each error rate calculated based on the identification information included in each of the plurality of electric signals;

selecting the set of setting value corresponding to the error rate smaller than a threshold value from the table when the monitored error rate exceeds the threshold value; and adjusting the setting value based on the selected set of setting value.

7. The method for adjusting a transmission characteristic as claimed in claim 6, wherein a bit error with respect to each of the electric signals is detected based on the identification information included in each of the electric signals, and the error rate is calculated based on the bit error.

8. The method for adjusting a transmission characteristic as claimed in claim 6, wherein the identification information is information for identifying data formed with each of the electric signals.

* * * * *